Jan. 10, 1950

W. A. AYRES 2,493,848

RECORD CARD

Filed March 28, 1947

INVENTOR
Waldemar A. Ayres
BY
John W. Armbruster
ATTORNEY

Patented Jan. 10, 1950

2,493,848

UNITED STATES PATENT OFFICE 2,493,848

RECORD CARD

Waldemar A. Ayres, Kew Gardens Hills, N. Y., assignor to International Business Machines Corporation, New York, N. Y., a corporation of New York Original application December 15, 1939, Serial No. 309,445, now Patent No. 2,366,827, dated January 9, 1945. Divided and this application March 28, 1947, Serial No. 737,772

8 Claims. (Cl. 235—61.12)

This is a division of my copending application Serial No. 309,445, filed December 15, 1939, now Patent 2,366,827, issued January 9, 1945, said application being further divided into three other copending applications, Serial No. 525,111, filed on March 4, 1944; Serial No. 525,112, filed on March 4, 1944; Serial No. 737,771, filed on March 28, 1947. The parent case, Patent 2,366,827, presents claims to the sensing devices cooperating with records having frictional indicia; the second case, Serial No. 525,112, issued as Patent No. 2,424,073 on July 15, 1947, contains claims for devices for controlling sheet feeding by frictional indicia thereon; the third case, Serial No. 525,111, issued as Patent No. 2,431,017 on November 18, 1947, asserts claims for a control element bearing index points of friction material; the fourth case, Serial No. 737,771, sets forth claims for a control element bearing index points which are mechanically treated to make them frictional; and the present case, Serial No. 737,772, presents claims for a control element bearing index points of lubricating material.

This invention relates generally to improvements in devices for making and sensing index points on accounting records and more specifically to means for marking or treating a record to change its frictional characteristics at differential points which are later sensed to control the accumulation and recording of the data represented. The frictional marks may also control the feeding of a sheet bearing them.

In the record controlled accounting machine art, it is customary to use cards which are perforated at differential points to be representative of data. These perforations are sensed electrically by brushes, or mechanically by pins, to control settable devices for adding and printing the data represented by the perforations. While the perforated cards are satisfactory, punching the records involves perforating devices of precision manufacture. Furthermore, there are the limitations of the existing system in that the record element is weakened in proportion to the number of index points cut therein and the area of the element receptive to printed information is limited by the portions cut out to provide control perforations.

An object of the present invention is to provide a control element or card with index points in the form of frictional surface marks which do not weaken the element and do not interfere with printed matter on the element. The friction material may be colorless to avoid confusion with the printed matter over which it may be placed.

A feature of the invention is the use of both sides of a machine control element to receive the friction material, thus doubling the data representing capacity of the element.

Another object of the invention is to provide a record element made of fine paper which is smooth to the touch but has a high coefficient of friction, said element having index points marked thereon with graphite, wax or powder to cause certain index areas to have a lower coefficient of friction than the body of the element. As an alternative form of record, there may be used a paper stock which appears rough to the touch but which has a low coefficient of friction and is receptive to marks made with frictional matter such as rubber, gum, ink, pitch or wax which are comparatively higher in frictional characteristics.

Another object of the invention is the provision of a record and record characters thereon made of friction material placed so that they cannot only be read, but also sensed to control accumulation and recording of the character represented.

Another object of the invention is to treat accounting records with frictional marking materials of either a water or oil base to fix data representing index points thereon. For example, the marking material may be composed of latex plus water soluble glue and added coloring material if desired. Another composition may include rubber dissolved in benzene or any other rubber solvent plus resin dissolved in turpentine plus coloring material, if desired.

Other objects of the invention will be pointed out in the following description and claims and illustrated in the accompanying drawings, which disclose, by way of example, the principle of the invention and the best modes, which have been contemplated, of applying that principle.

Figures 1, 2, 2A:
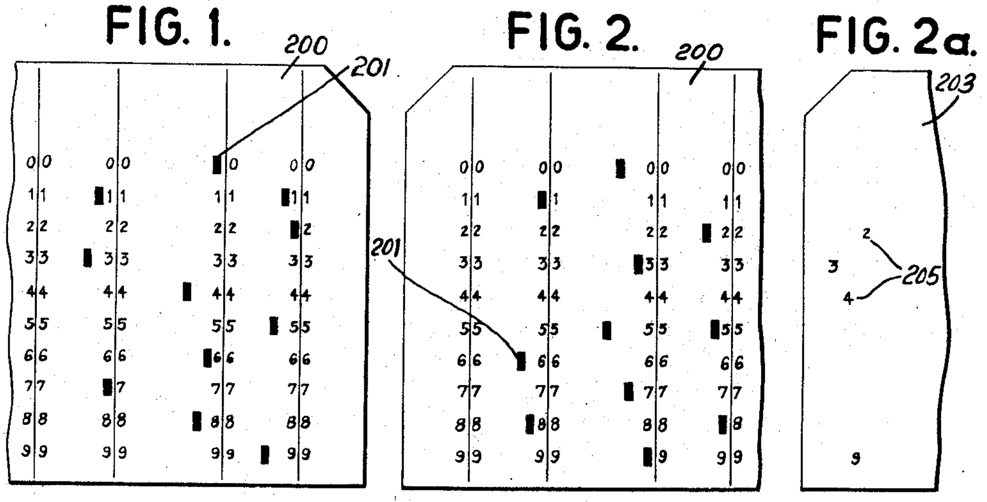
Fig. 1 shows one side of a record card marked with friction material to form data representing index points.
Fig. 2 shows the other side of the card shown in Fig. 1.

Fig. 2*a* shows a portion of the record element whereon the index points are printed as readable characters composed of friction material suitable for controlling the sensing devices.

Figure 3:
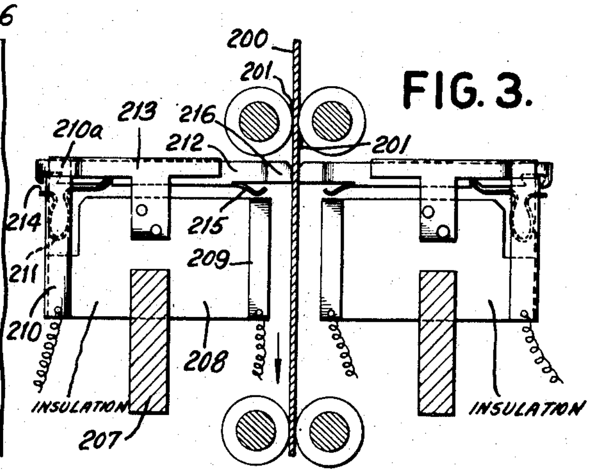

Fig. 3 is an elevation view showing two friction marked sensing devices cooperating with the opposite sides of a record element such as the card shown in Figs. 1 and 2.

Figure 4:
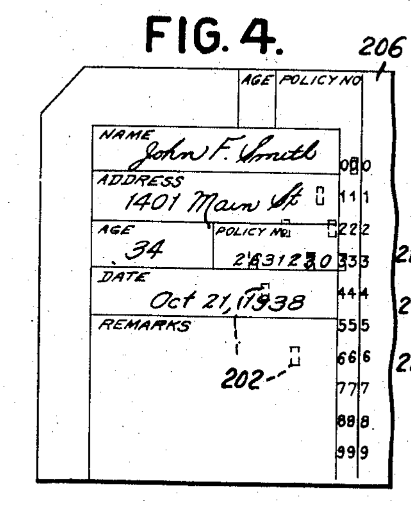

Fig. 4 is a portion of the record element carrying printed and written matter over which colorless friction index points are marked.

Figure 5:
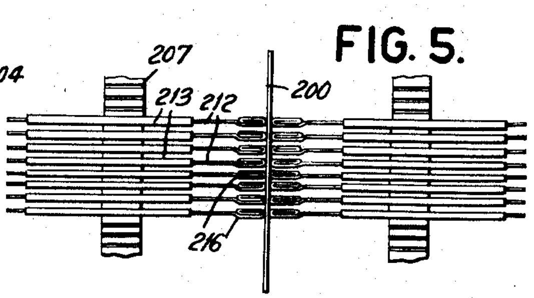

Fig. 5 is a plan view of a series of sensing devices cooperating with both sides of a record element and spaced to coincide with the regular columnar spacing of the eighty column card.

Figure 6:
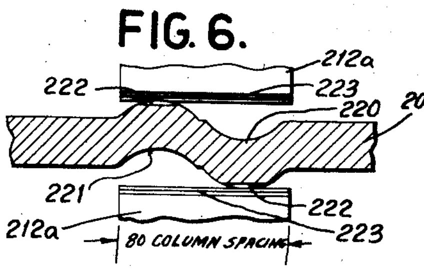

Fig. 6 shows an alternative method of crimping a record element so that two embossed ridges are within the usual eighty column spacing and on opposite sides of the record element. An area of friction is incised at a particular index point to cooperate with and actuate a serrated point of a sensing element as the record is drawn past the sensing position.

Before pointing out the various combinations of substances from which the records and index points may be constituted, it may be explained that the variations are as numerous as the kinds of matter to be found with different frictional characteristics. As a general rule materials with rough, hard surfaces were found to have a low coefficient of friction and the cooperating sensing fingers slid over such surfaces but was retarded when a spot of rubber, gum, wax or pitch engaged the finger.

The materials found satisfactory for establishing areas of friction on record members of a low friction surface such as sheet metal, card stock, newsprint, typewriter paper, or the like are as follows:

| Rubber | Wax |
|---|---|
| rubber cement and pitch.<br>Lotol.<br>Lotol and machine oil.<br>latex and glue.<br>Neoprene cement, resin and turpentine. | beeswax.<br>paraffin.<br>crayon.<br>China marking pencil or any of the above dissolved in alcohol, acetone, turpentine, carbon disulphide or benzol. |

| Gum | Pitch |
|---|---|
| resin.<br>resin, turpentine, rubber cement and machine oil. | fluid pitch.<br>pitch dissolved in benzine, gasoline, or carbon tetrachloride. |

The materials which performed satisfactorily in creating areas of a low coefficient of friction on record members of a higher frictional value such as sheet aluminum, weighted papers, and other materials smooth to the touch, were found to be graphite, wax, China marking pencil, or the foregoing dissolved in alcohol, acetone, turpentine, carbon-disulphide, or benzol. In record members of this kind, perforations and depressions are as effective as the low friction material in influencing movement of the sensing fingers.

From the foregoing, it is apparent that some marking materials are effective on either kind of record. This is so when the frictional index of the material is midway between the friction values of the surfaces of record members having extremely high or low coefficients of friction.

The friction material when in the form of a solid may be marked or deposited on the records in the differential positions. When liquefied it may be carried on ribbons or pads and transferred therefrom to the record material in any well known manner of printing. Coloring pigment may be added to the friction deposit material when distinctive character or index point outlines are to be made, otherwise a clear colorless deposit will serve for most purposes. The friction materials may also be either the same color as the background or contrasted therewith according to the purpose of hiding or revealing the marks.

Instead of using material to form a frictional area, a certain portion or area of the surface of a record may be treated mechanically to create a surface having a coefficient of friction differing from the surrounding areas. The printing impression arm 91, described hereinbefore, can be formed with a striking face that acts mechanically to indent, emboss, roughen or smooth a record surface, rather than deposit material thereon.

Another important feature of the present invention is the marking of such frictional areas at differential points on record cards and the cooperation therewith of devices for sensing the marks and controlling the accumulation and printing of the data represented by the marks. For example, in Figs. 1 and 2, the two sides of a portion of a record card 200 are seen to carry a series of frictional marks 201 situated horizontally in various denominational order positions and arranged vertically from the bottom reference edge of the card to be representative of the various digits. The placement of the marks corresponds with the perforation positions in control elements that are usually punched in a way well known in the art. However, the disclosed method of providing an index point has the advantage that it does not weaken the record element and it also enlarges the capacity of the element, since the marks may be made on both sides of the element and sensed as shown in Fig. 3.

A further advantage in the use of frictional index points is illustrated on the record 206 shown in Fig. 4. There it is seen that a number of index points 202 are of colorless friction material and represented by a dotted outline, although these marks are transparent and do not interfere with the written and printed matter over which they are placed.

Fig. 2*a* illustrates a still further advantage gained by the use of marking material having frictional characteristics. The record element 203 carries a series of numerals 205 which not only represent the amount 34.92 but they are also differentially placed and made of a frictional substance to cooperate with sensing devices, so that the amount they represent may be read off the element and used to control adding and printing devices.

In Fig. 3 is shown a form of sensing device adapted to be influenced by the varying frictional characteristics of the surface on a record element 200. Although the sensing devices are shown duplicated on the opposite sides of the record, only one set need be considered since they are similar in all respects. A comb 207 is fixed across the machine and supports a series of insulation members 208, one for each denominational order. Clamped to the front end of each insulation member 208 is a metallic strip 209 carrying the terminal for one end of the electrical connections through the sensing device. Clamped at the opposite end of member 208 is another metallic strip 210 formed as a channel containing a wire bow spring 211 engaging in a notch cut into the bottom edge of a sliding sensing finger 212. Finger 212 is guided in the horizontal part of a T-shaped channel 213 riveted on the top of insulation member 208. The rear end of finger 212 is notched at 214 to cooperate with the upper edge of channel 210 to limit the sliding movement of finger 212 when the record 200 moves away from the sensing devices. An extension 210*a* on channel 210 presses against the side of finger 212 and maintains electrical circuit connection between the two parts.

Spring 211 serves to hold finger 212 upward so that a contact extension 215 thereon is normally separated from the contact piece 209 attached to the front of the insulation blank 208. The spring also provides a horizontal thrust to press the forward end of the finger against the record material so that the finger remains in the upper position shown until it encounters an area of such a frictional nature that the end of the finger is carried along therewith and down to close a circuit between contact 215 and strip 209.

The fingers and the ends thereon may be made of various material to get the frictional characteristics desired. For example, it is known that metals such as aluminum, lead, and bronze have a higher coefficient of friction than other metals, such as steel, chromium and nickel, when other factors such as nature of cooperating material, kind of surface, polish, etc. are taken into consideration.

Instead of depending on the frictional characteristics of materials, it is also possible to set up frictional areas by treating the record mechanically as by impressing or embossing lines of resistance on the surface of the record card. For example, in Fig. 6 there is shown a portion of a record 204 in cross-section with a pair of channels 220 and 221 formed on opposite sides within a space devoted to one column of a record. Along the top of the embossed ridges formed on the card, and at particular index points, there are impressed a series of transverse depressions 222 designed to present more than the usual frictional resistance to the passage of the record 204 under the serrated points 223 of the sensing fingers 212*a*. These fingers 212*a* also have associated therewith the contact making and breaking components illustrated in Fig. 3.

The impulses created by the sensing devices shown in Fig. 3 are initiated at differential times in the same fashion that impulses are initiated through perforations as is common in the art. These impulses are then directed through printing and adding control magnets. Circuit breaking devices are provided to prevent the creation of circuits at positions other than the regular index point positions. In this way encountering the edge of each card, and the space between cards, has no effect on the adding and printing devices, even though the sensing finger contacts close at such times.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A machine control element bearing index points of a lubricating material such as powder, which is deposited at differential positions thereon to be representative of data.

2. A machine control element bearing index points of a lubricating material such as wax, which is deposited at differential positions thereon to be representative of data.

3. A machine control element bearing data representing index points composed of deposits of wax dissolved in alcohol, acetone, turpentine, carbondisulphide or benzol.

4. A machine control element bearing index points established by depositing colorless lubricating material such as wax at differential points on said element to represent data thereon.

5. A machine control element bearing colorless index points of a colorless lubricating material such as wax dissolved in alcohol, acetone, turpentine, carbon disulphide, or benzol, which is deposited at differential positions thereon to be representative of data.

6. A machine control element of sheet aluminum, said element bearing index points of a lubricating material such as wax which is deposited at differential positions thereon to be representative of data.

7. A machine control element of weighted paper, said element bearing index points of a lubricating material such as powder which is deposited at differential positions thereon to be representative of data.

8. A machine control element of weighted paper, said element bearing index points of a lubricating material such as wax which is deposited at differential positions thereon to be representative of data.

WALDEMAR A. AYRES.

REFERENCES CITED

The following references are of record in the file of this patent:

UNITED STATES PATENTS

| Number | Name | Date |
|---|---|---|
| 2,084,848 | Lasker | June 22, 1937 |
| 2,107,008 | Lasker | Feb. 1, 1938 |
| 2,294,681 | Moon | Sept. 1, 1942 |
| 2,366,827 | Ayres | Jan. 9, 1945 |